United States Patent [19]

Hunter et al.

[11] Patent Number: 4,702,064
[45] Date of Patent: Oct. 27, 1987

[54] CROP FINGERS FOR HARVESTERS

[75] Inventors: Victor L. Hunter, Willetton; Alan D. Fisher, Graylands, both of Australia

[73] Assignee: Clarewood Pty. Ltd., Redcliffe, Australia

[21] Appl. No.: 786,748

[22] Filed: Oct. 9, 1985

[30] Foreign Application Priority Data

Oct. 9, 1984 [AU] Australia .............................. PG7559

[51] Int. Cl.⁴ ............................................. A01D 34/18
[52] U.S. Cl. ......................................... 56/312; 56/310
[58] Field of Search ............................ 56/310, 312, 313

[56] References Cited

U.S. PATENT DOCUMENTS

| 791,022 | 5/1905 | Gaterman | 56/313 |
|---|---|---|---|
| 2,287,304 | 6/1942 | Hall | 56/312 |
| 2,394,838 | 2/1946 | Beltz | 56/312 |
| 4,575,998 | 3/1986 | Brooks | 56/312 |

FOREIGN PATENT DOCUMENTS

| 22958 | 4/1962 | German Democratic Rep. ... | 56/313 |
|---|---|---|---|
| 279197 | 3/1952 | Sweden ................................. | 56/313 |

Primary Examiner—Paul J. Hirsch
Attorney, Agent, or Firm—Harness, Dickey & Pierce

[57] ABSTRACT

Disclosed is a crop finger extension for knife-finger guards of harvesting machines. The crop finger extension is detachably mountable on a crop finger body having an underside and an outer end. The crop finger extension includes a body portion having an upper surface with a forward end and a rearward end. A recess is provided in the body portion adjacent the rearward end of the upper surface to snugly receive the outer end of the crop body. A rearward extension extends rearwardly of the recess on the underside thereof and is adapted to locate against the underside of the finger body. The rearward extension is provided with first means engagable with corresponding second means on the finger body to lock the finger extension in position on the finger body. A crop finger is also disclosed.

5 Claims, 7 Drawing Figures

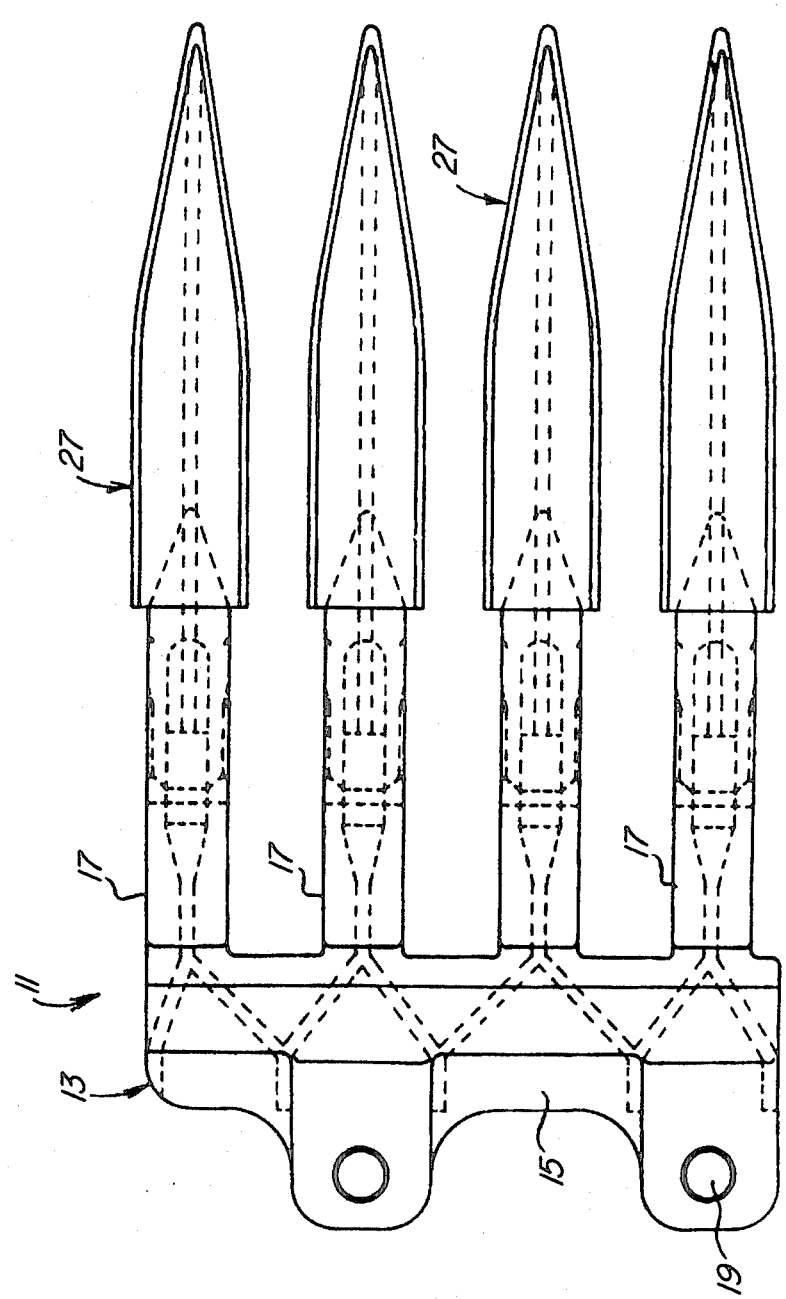

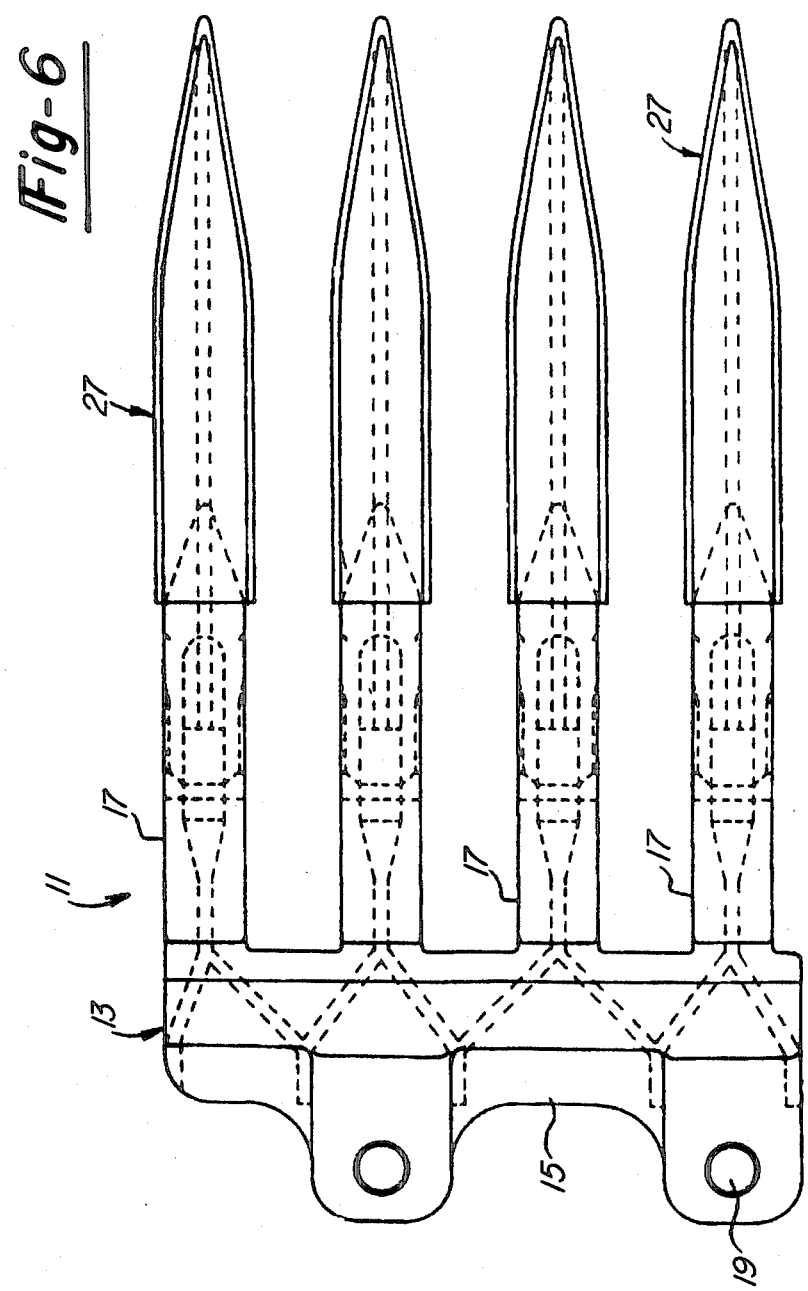

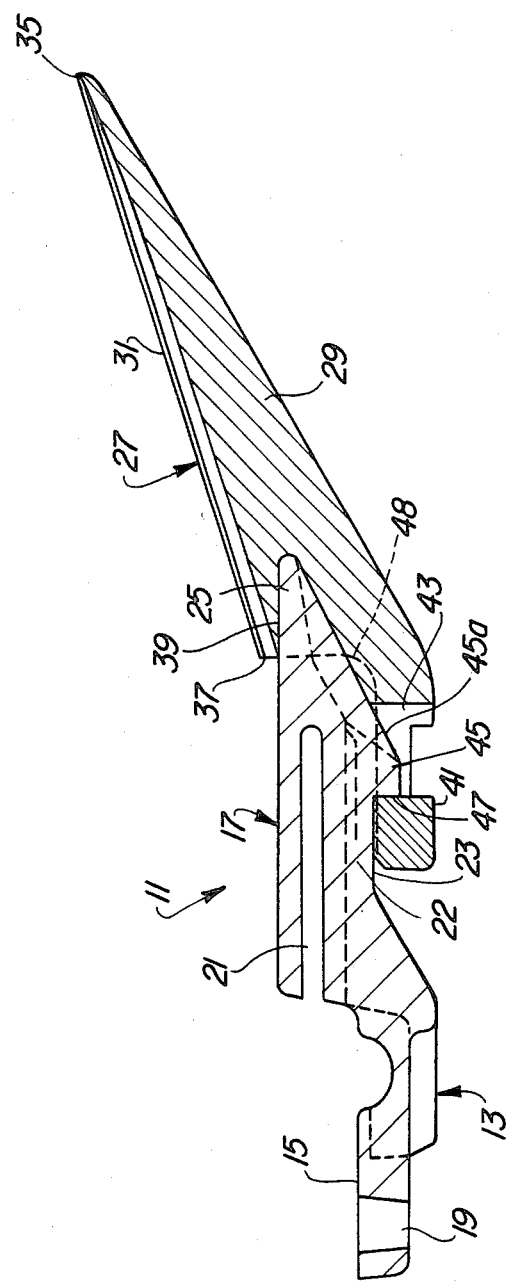

CROP FINGERS FOR HARVESTERS

This invention relates to crop fingers for harvesters and to extensions for such crop fingers.

The knife-guard fingers of cutterbar and comb assemblies of agricultural harvesting machines are generally not entirely satisfactory for all crop conditions. In light crops conditions, for example, it has been found that there is an unacceptable level of grain loss over the leading edge of the crop fingers and through the gaps between adjacent crop fingers. There have been various proposals for reducing the crop losses and one such proposal relies on the reduction of the gap widths between adjacent crop fingers by providing "double cut" finger guards having four fingers on each knife-guard finger section rather than two fingers as usually supplied by manufactures of harvesting machines. These "double cut" finger guards have been employed extensively in Australia where crop conditions are light in comparison to those in the United States of America and Canada. The "double cut" finger guards are provided with fingers of extended length so as to provide a surface area ahead of the cutterbar to catch forwardly falling crop and to assist in guiding the crop into the fingers. While the "double cut" finger guards effective in reducing grain loss in light crop conditions, they suffer from the deficiency that the gap between adjacent crop fingers is of a fixed width and therefore cannot be varied according to the crop conditions.

The present invention seeks to provide a crop finger extension which is detachably mountable on a crop finger body to facilitate selective variation of the gap width between adjacent crop fingers according to the width of the crop finger extension.

In one form the invention resides in a crop finger extension detachably mountable on a crop finger body having an underside and an outer end, the crop finger extension comprising: a body portion having an upper surface with a forward end and a rearward end, a recess in the body portion adjacent the rearward end of the upper surface to snugly receive the outer end of the crop body, and a rearward extension extending rearwardly of the recess on the underside thereof; the rearward extension being adapted to locate against the underside of the finger body and being provided with first means engagable with corresponding second means on the finger body to lock the finger extension in position on the finger body.

Preferably, the recess is in the form of a socket.

Preferably, the first means comprises a recess in the rearward extension and the second means comprises a projection on the underside of the finger body.

The recess may be in the form of a circular hole in which case the projection is simply a spigot. It is, however, preferred that the projection has a leading face which extends downwardly and rearwardly so as to be less likely to snag or otherwise ensnare crop in the event of the finger body being used as a crop finger without the finger extension in position.

In another form the invention resides in a crop finger comprising a finger body having an underside and an outer end; a finger extension detachably mounted on the finger body, the finger extension comprising a body portion having an upper surface with a forward end and a rearward end, a recess in the body portion adjacent the rearward end of the upper surface to snugly receive the outer end of the finger body, and a rearward extension extending rearwardly of the recess 67 the underside thereof; the rearward extension locating against the underside of the finger body and being provided with a first means engaging with a corresponding second means on the underside of the finger body to lock the finger extension in position on the finger body.

The first means may comprise a recess in the rearward extension of the finger extension and the second means may comprise a projection on the underside of the finger body. The recess may be in the from of a circular hole in which case the projection is simply a spigot. However, it is preferred that the projection has a leading surface which extends rearwardly and downwardly.

The outer end of the finger body may be tapered to a point so that it may function as a crop finger in the normal manner if so required.

In still another form the invention resides in a crop finger construction comprising: a base plate; a plurality of spaced finger bodies projecting from the base plate, each finger body having an underside and an outer end; a finger extension mountable on each finger body; each finger extension comprising a body portion having an upper surface with a forward end and a rearward end, a recess in the body portion adjacent the rearward end of the upper surface to snugly receive the outer end of the crop body, and a rearward extension extending rearwardly of the recess on the underside thereof, the rearward recess locating against the underside of the finger body and being provided with first means engaging with corresponding second means on the finger body to lock the finger extension in position on the finger body.

The invention will be better understood by reference to the following description of one specific embodiment thereof as shown in the accompanying drawings in which:

FIGS. 4, 5 and 6 are plan views of a finger body casting with finger extensions of different widths fitted thereon; and FIG. 7 is a sectional view on the line 7—7 of FIG. 4.

Figure 1:
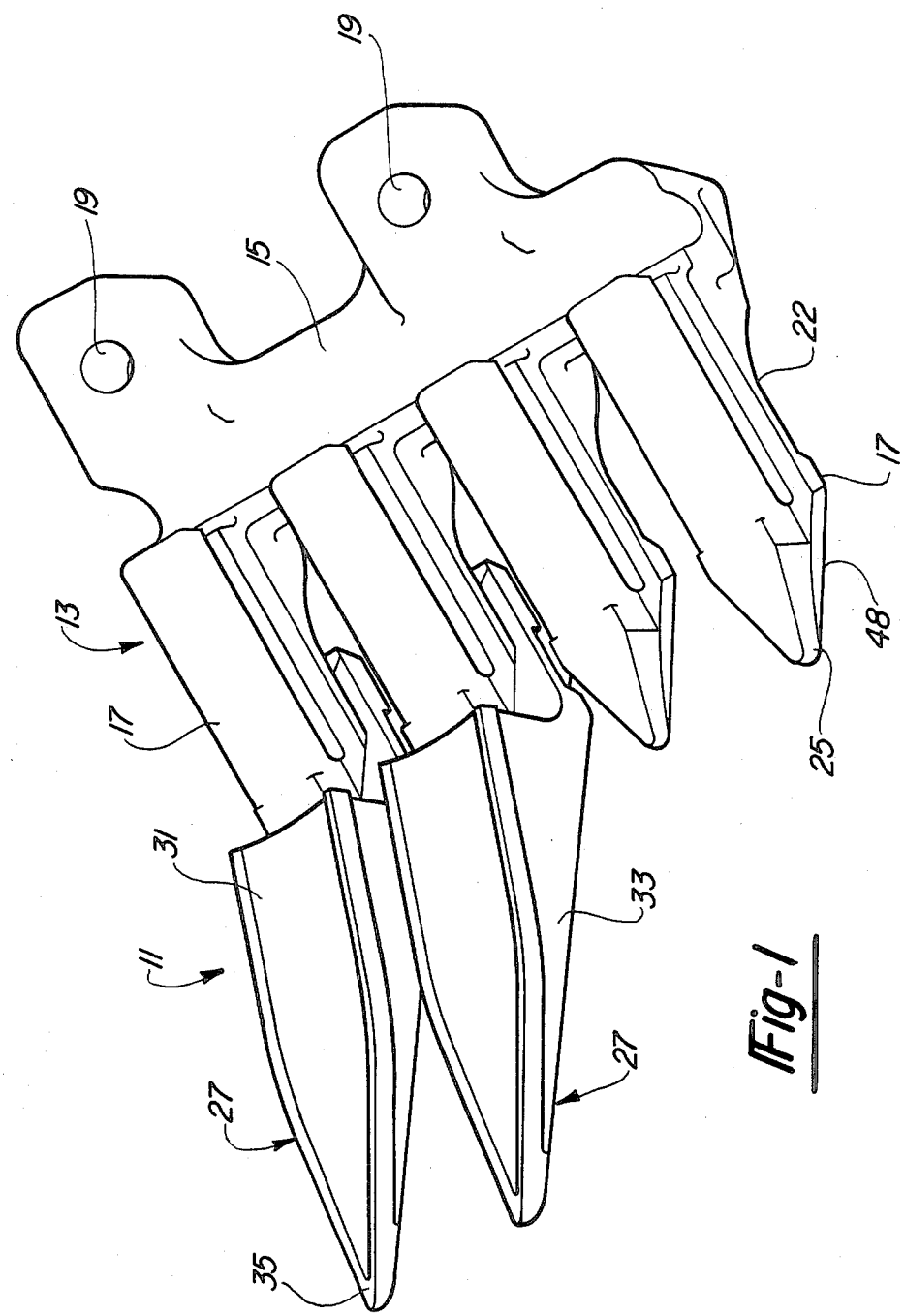
FIG. 1 is a perspective view of a finger body casting having four finger bodies with two of the finger bodies fitted with finger extensions.
Figure 2:
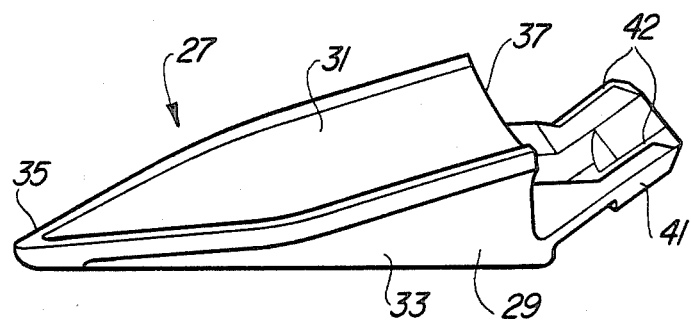
FIG. 2 is a perspective view of a finger extension.
Figure 3:
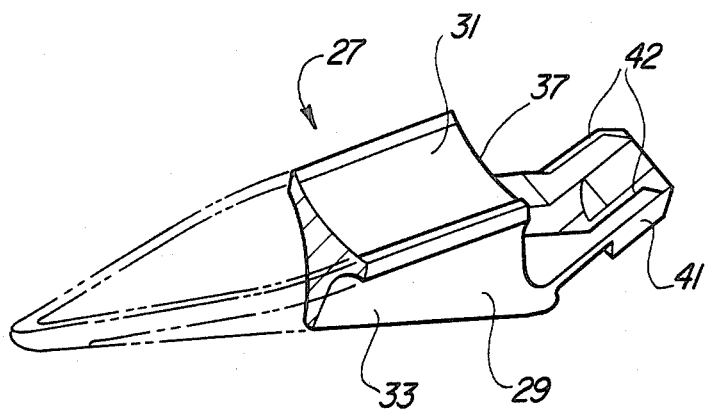
FIG. 3 is a sectional perspective view of a finger extension.

In the drawings, there is shown a knife guard section 11 which together with similar knife guards sections is intended to replace the conventional knife-guards of a header front. The knife guard section 11 is in the form of a casting 13 having a base plate 15 and a plurality of spaced forwardly projecting finger bodies 17 (of which there are four in the preferred and illustrated arrangement). The base plate is provided with holes 19 to enable it to be bolted to the header front in the conventional manner. The upper portion of each finger body is provided with a cutterbar slot 21 which accommodates the cutterbar (not shown) of the header. The finger bodies each have longitudinal side walls 22 which taper inwardly in the downward direction, an underside 23 and an outer end 25 which tapers to a point so that the finger body may function as a crop finger in the normal manner it so required.

The casting 13 is of cast iron and for preference is coated with a baked powder coating which is hard wearing and slippery so as to assist movement of crop over the casting.

A finger extension 27 is provided for each finger body 17. Each finger extension is moulded from a suitable plastics material such as acetal co-polymer.

Each finger extension 27 comprises a body portion 29 having an upper surface 31 and an under surface 33. The upper surface 31 has a front end 35 tapering to a point and a rear end 37.

A recess 39 is formed in the body portion 29 at a location adjacent the rear end of the upper surface 31, as best seen in FIG. 7 of the drawings. The recess 39 is in the form of a socket shaped to snugly receive the outer end portion 25 of the finger body, also is best shown in FIG. 7 of the drawings.

The body portion 29 of each finger extension is further provided with a tail or rearward extension 41 which extends rearwardly along the underside of the finger body from a location below the recess 39 in the body portion, as shown in the drawings. Upstanding engaging means such as flanges 42 are provided along the longitudinal sides of the rearward extension, each flange being adapted to locate against the adjacent side wall 22 of the finger body to provide a degree of lateral stability to the finger extension when positioned on the finger body. The inner face of each flange is of a shape complementary to that of the tapering side wall 22 of the finger body. The rearward extension 41 is provided with a first means 43 engagable with a corresponding second means 45 on the underside of the finger body whereby to lock the extension finger in position on the finger body. The first means 43 is in the form of a hole or other recess in the rearward extension and the second means 45 is in the form of a projection on the underside of the finger body. The projection 45 has a leading face 45a which tapers downwardly and rearwardly and a trailing face 47 against which the rearmost surface wall of the hole 43 enages, as best seen in FIG. 7 of the drawings. The leading face 45a of the projection is a continuation of a surface 48 forming part of the point provided at the outer end 25 of the finger body. This feature reduces the likelihood of the projection snaring crop in the event of the finger body being used as a crop finger without the finger extensions in position.

The underside of the body portion 29 is shaped to facilitate guidance of crop into the fingers; that is to say, that there is no abrupt variations in the profile of the undersurface which would serve to snag or otherwise impede movement of the crop towards the cutter bar of the harvesting machine.

The extension fingers may be quickly and easily positioned on the finger bodies. In this connection, each finger extension is initially positioned with its rearward extension 41 located below the underside of the corresponding finger body and with the outer portion of the finger body received in the recess 39 in the body portion of the finger extension. The finger extension is then pivoted about the finger body so as to move the projection on the underside of the finger body into snap engagement with the hole 43 formed in the rearward extension 41. The finger extension may be readily removed by using a reverse procedure, although leverage would normally be required between the finger body 17 and the rearward extension 41 of the finger extension in order to disengage the projection 45 and the hole 43.

Figure 4:
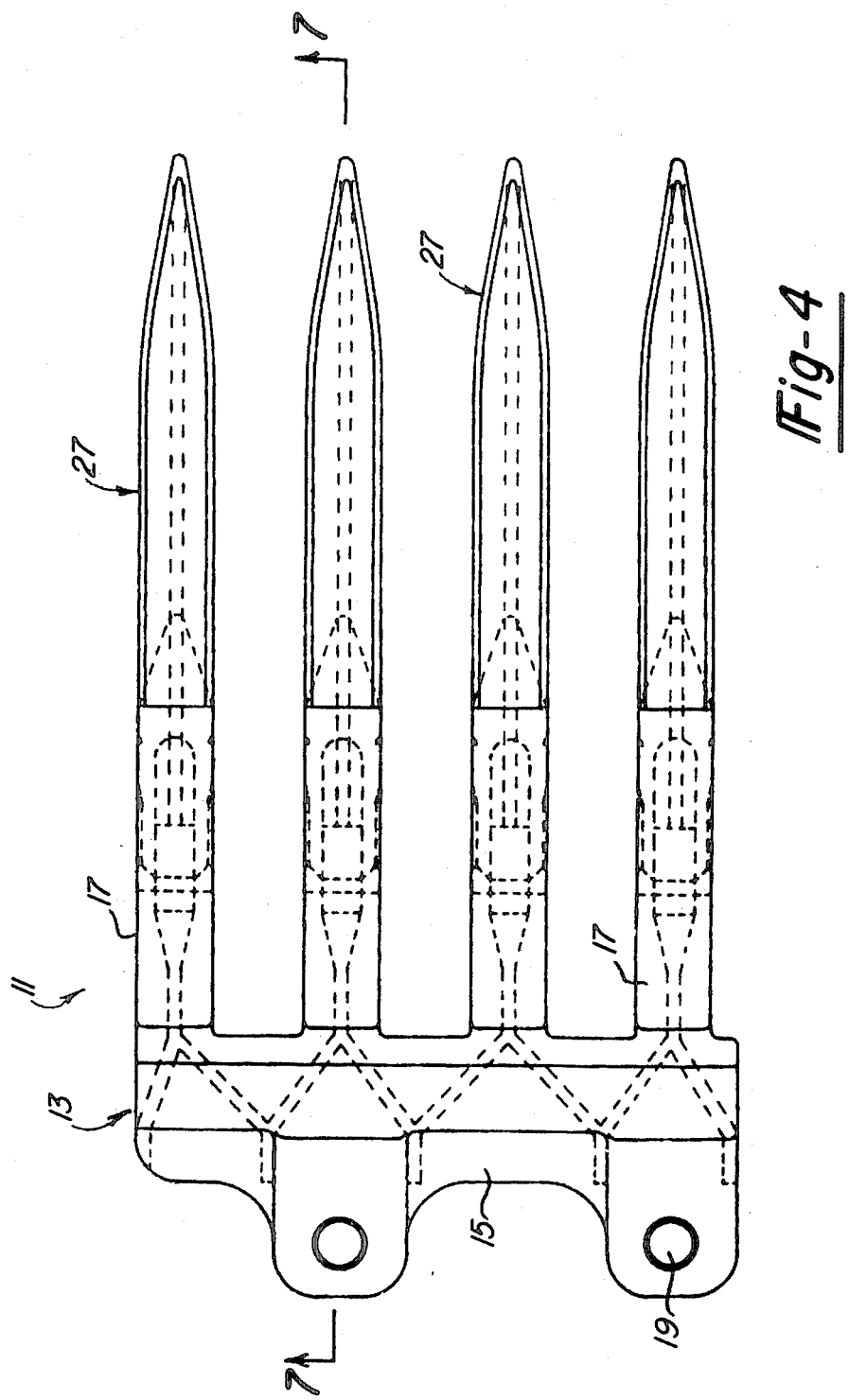

From the foregoing, it is evident that the present invention provides a crop finger having a finger extension which may be easily installed and removed. This enables the gap width between crop fingers to be varied by fitting finger extensions of suitable widths. If a light crop is to be harvested, the crop fingers may be made wide to reduce the spacing between adjacent crop fingers whilst thinner crop fingers may be used for heavier crops. This is illustrated in FIGS. 4, 5 and 6 of the accompanying drawings in which are shown finger extensions of various widths fitted onto the finger bodies. The present invention also allows the extensions to be easily replaced in the event of breakage or damage. Moreover, the present invention overcomes the problem of excess weight normally associated with all-cast crop fingers.

It should be appreciated that the scope of invention is not limited to scope of the embodiment described.

We claim:

1. A crop finger extension detachable mountable on a crop finger body having an underside and an outer end, the crop finger extension comprising: a one piece body portion having an upper surface with a forward end and a rearward end, a recess in the body portion adjacent the rearward end of the upper surface to snugly receive and envelop the outer end of the crop finger body, and an integral rearward extension extending rearwardly of said recess on the underside thereof; said rearward extension being adapted to locate against the underside of the finger body and being provided with first means engagable with corresponding second means on said crop finger body underside to lock said finger extension in position on the finger body wherein upstanding engaging means are provided along the longitudinal sides of the rearward extension, the engaging means being adapted to engage against the longitudinal sides of the finger body.

2. A crop finger extension as claimed in claim 1 wherein the recess is in the form of a socket complimentary in shape to the outer end of said crop finger body.

3. A crop finger extension as claimed in claim 1 the first means comprises a recess in the rearward extension and the second means comprises a projection on the underside of the finger body.

4. A crop finger extension as claimed in claim 3 wherein the projection has a leading surface which extends rearwardly and downwardly.

5. A crop finger extension as claimed in claim 4 wherein the outer end of the finger body is tapered to a point, said leading surface of the projection being a continuation of a surface forming part of the point at the outer end of the finger body.

* * * * *